(12) United States Patent
Van Lierde et al.

(10) Patent No.: US 9,740,960 B2
(45) Date of Patent: Aug. 22, 2017

(54) METHOD AND SYSTEM FOR REGISTRATION/ALIGNMENT OF 3D DIGITAL MODELS

(71) Applicant: DENTSPLY IMPLANTS NV, Hasselt (BE)

(72) Inventors: Carl Van Lierde, Meerbeke (BE); Joris Vanbiervliet, Kessel-Lo (BE); Pieter De Ceuninck, Gelrode (BE); Stefaan Dhondt, Webbekom (BE); Veerle Pattijn, Kessel-Lo (BE); Jan Heyninck, Mechelen (BE)

(73) Assignee: DENTSPLY IMPLANTS NV, Hasselt (BE)

( * ) Notice: Subject to any disclaimer, the term of this patent is extended or adjusted under 35 U.S.C. 154(b) by 209 days.

(21) Appl. No.: 14/428,868

(22) PCT Filed: Sep. 26, 2013

(86) PCT No.: PCT/EP2013/070059
§ 371 (c)(1),
(2) Date: Mar. 17, 2015

(87) PCT Pub. No.: WO2014/049049
PCT Pub. Date: Apr. 3, 2014

(65) Prior Publication Data
US 2015/0235104 A1    Aug. 20, 2015

(30) Foreign Application Priority Data
Sep. 26, 2012    (GB) .................................. 1217179.9

(51) Int. Cl.
*G06F 9/00*    (2006.01)
*G06K 9/62*    (2006.01)
(Continued)

(52) U.S. Cl.
CPC ............. *G06K 9/6215* (2013.01); *G06K 9/52* (2013.01); *G06T 3/00* (2013.01); *G06T 7/0012* (2013.01); *G06T 7/0079* (2013.01)

(58) Field of Classification Search
None
See application file for complete search history.

(56) References Cited

U.S. PATENT DOCUMENTS

2005/0243088 A1* 11/2005 Lengyel .................. G06T 15/04
345/420
2008/0038684 A1* 2/2008 Keating ............. A61C 13/0004
433/24
(Continued)

OTHER PUBLICATIONS

International Search Report (ISR) dated Jan. 2, 2014, for PCT/EP2013/070059.
(Continued)

*Primary Examiner* — Weiwen Yang
(74) *Attorney, Agent, or Firm* — Bacon & Thomas, PLLC (57) ABSTRACT

Systems and methods, devices and software are described for use in image comparison such as required for medical planning such as in dental implantology or other applications that require registration of digital images. A method and system is described for automatically finding correspondences between two or more digital representations such as images of one or more 3D objects with an identical, partially identical or similar geometry. The method and system, devices and software have the advantage that although the different digital representations of the object may be influenced by either noise, or scatter, or occlusion, or clutter, or any combination of these, correspondence can be found.

28 Claims, 5 Drawing Sheets

(51) Int. Cl.
*G06T 3/00* (2006.01)
*G06K 9/52* (2006.01)
*G06T 7/00* (2017.01)

(56) References Cited

U.S. PATENT DOCUMENTS

2011/0304332 A1* 12/2011 Mahfouz ............... A61F 2/3094
  324/309
2015/0065868 A1*  3/2015 Liang .................... A61B 1/31
  600/425

OTHER PUBLICATIONS

Written Opinion dated Jan. 2, 2014, for PCT/EP2013/070059.
International Preliminary Report on Patentability (IPRP) dated Jan. 8, 2015, for PCT/EP2013/070059.
Second Written Opinion dated Oct. 7, 2014, for PCT/EP2013/070059.
Bosse et al., "Place recognition using regional point descriptors for 3D Mapping", Field and Service Robotics, vol. 62, pp. 195-204, Berlin, Jan. 1, 2010.
Johnson, "Spin-images: A representation for 3-D Surface Matching", pp. 1-288, Aug. 13, 1997.
Esat et al., "Surface alignment based on the moment of inertia and improved least-squares methods", Proceedings of the Institution of Mechanical Engineers, pp. 547-554, Jan. 1, 2000.
Gafar et al., "Surface area distribution descriptor for object matching", Journal of Advanced Research, Amsterdam, vol. 1, No. 3, pp. 233-241, Jul. 1, 2010.

* cited by examiner

METHOD AND SYSTEM FOR REGISTRATION/ALIGNMENT OF 3D DIGITAL MODELS

The present invention relates to systems and methods, devices and software for use in image comparison such as required for medical planning such as in dental implantology or other applications that require registration of digital images.

BACKGROUND

The current state-of-the-art within dental implantology is the use of implant planning software based on (CB)CT images of the patient's jaw and remaining dentition that allows diagnosis and implant planning in 3D. A typical second step is the transfer of the planned implant positions to the mouth of the patient by means of a surgical drilling template, which can be either tooth-, mucosa-, or bone-supported. In case of CAD-CAM tooth-supported drilling templates a high-resolution digital model of the patient's dentition is needed for the design and manufacturing of a well-fitting drilling template. Therefore a high-resolution model needs to be accurately registered/matched with the (CB)CT data of the patient's jaw. The high-resolution digital model of the patient's dentition can be obtained directly (e.g. intra-oral scan) or indirectly (e.g. optical or (CB)CT scan of plaster cast or impression).

Typical registration techniques are based on the ICP (Iterative Closest Points) algorithm and try to minimize the distance error between the two objects. These registration techniques work very well for "identical" objects, but not in case objects are by default only partially "identical". In case of partially identical objects it is needed to first mark the identical parts in order to optimize the registration using ICP algorithms. These registration techniques also require a good starting position which is typically obtained by manually indicating some corresponding points or areas on both objects. Another disadvantage of these registration techniques is that these do not always yield the best registration result. The registration result can depend on the choice of the starting position since it could be the case that the registration algorithm ends in a local minimal value for the distance error instead of the global minimum of the distance error. This could be avoided by either performing the registration using a large number of starting positions or verifying all possible positions of one object with respect to the other but both would be too time-consuming. In the above-mentioned application the high-resolution digital model of the patient's dentition includes the teeth and the surrounding mucosa, while the (CB)CT-based model includes the patient's teeth and the bone, not the mucosa. Moreover the (CB)CT-based model is very often noisy and contains scatter due to metallic filling materials used in dental treatments. Therefore a fully automated registration technique that limits the influence of the "non-identical" surfaces/information onto the final matched position would be a major advantage, since it would reduce an intrinsic source of inaccuracy in computer guided implantology.

Figure 1:
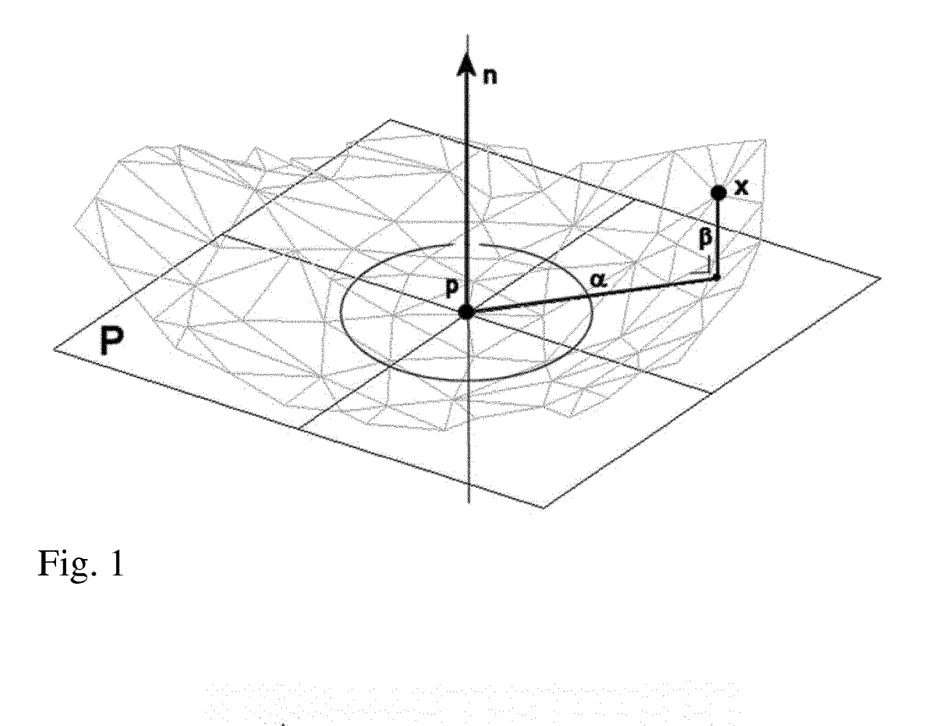
FIG. 1 shows an oriented point basis created at a vertex in a surface mesh. The position of the oriented point p is the 3D position of the vertex and the direction of the oriented point is the surface normal n at the vertex. Two coordinates can be calculated for a vertex x given an oriented point: α the radial distance to the surface normal n and β the signed distance above the plane P.
Figure 2:
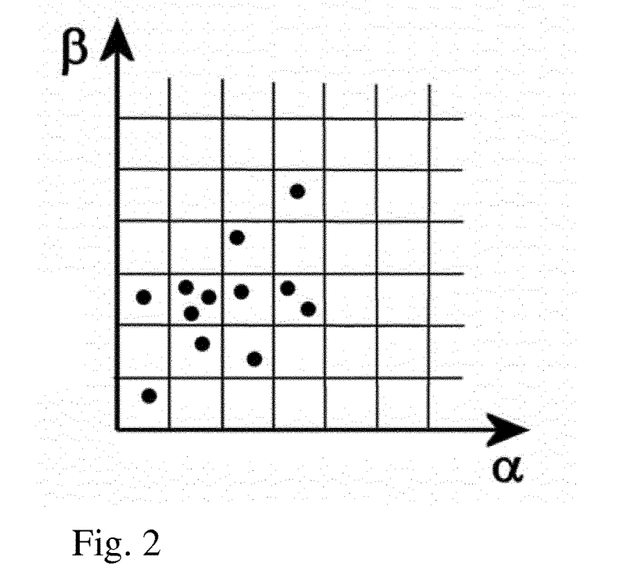
FIG. 2 shows points of surface mesh added to the 2-D array representation.
Figure 3:
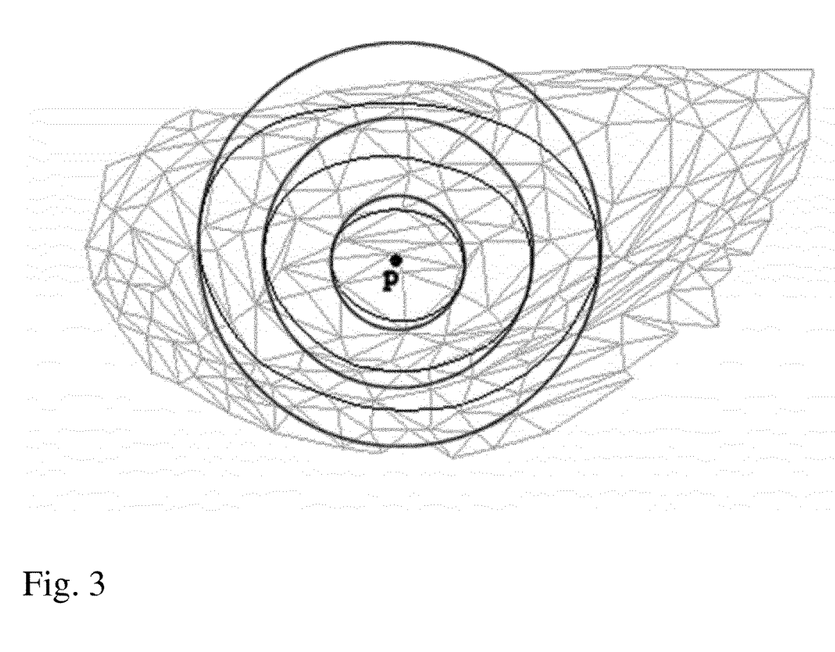
FIG. 3 shows a set of concentric spheres defined to determine the shell image for a point on the surface.

A state-of-the-art registration technique that works in case of occlusion (i.e. incomplete surface description of the object, missing surfaces) and clutter (i.e. presence of surfaces that are not part of the object surface being matched) is based on the use of spin images. As described in the thesis from Andrew Edie Johnson, *Spin-images: A Representation for 3-D Surface Matching* (Aug. 13, 1997 Carnegie Mellon University, Pittsburgh, Pa., USA), spin images can be used either for object recognition or for surface alignment (i.e. registration). The spin image is a local description of the shape of the object and is created by projecting 3D surface points into 2D images. For this approach a surface is described as a dense collection of 3D points and their surface normal. The spin images are based on an oriented point of the surface, i.e. a point p on the surface and the outside oriented surface normal n in this point. This oriented point defines a local coordinate system by means of the plane P through the point p oriented perpendicularly to the normal n (FIG. 1). The two coordinates of a point within this local coordinate system are $\alpha$, the perpendicular distance to the normal n, and $\beta$, the signed perpendicular distance to the plane P. Thus each 3D surface point can be mapped onto the 2D coordinates of a particular basis (p,n). A consequence of this cylindrical symmetry is that points that lie on a circle parallel to the plane P and centred on n will have the same coordinates ($\alpha,\beta$) with respect to the basis. As such a 2D point distribution is created for a specific surface point and its normal. This 2D point distribution is further simplified/discretized by creating a 2D array representation of the spin image, which quantifies the point density. This is done by creating a rectangular grid (2D array) in which the (alfa, beta) coordinates are assigned to the cells (FIG. 2) and quantifying the point density for each cell of the grid. A simple way to update the array is by incrementing the cell to which the 3D point is spin-mapped with one. A more robust way, in order to account for noise in the data, is by bilinearly interpolating the contribution of a point to the four surrounding cells in the 2D array.

This 2D point distribution is a description of the shape of a rigid object (vertices) which is independent of rigid transformations, and thus a truly object-centred shape description. Thus spin images generated for corresponding points on different surfaces will be similar, so oriented points can be matched based on a comparison of the 2D array. Since spin images can be generated for any point on the surface, no feature extraction is required.

The spin images are generated by using all of the points of the object and not only a small number of feature points. As such memory and computer power will increase with the size of the object.

The spin images need to be generated with a well-chosen cell size in order to be descriptive. A cell size of about 1 to 2 times the mesh resolution is sufficient to limit the influence of the individual point positions on the spin image and to adequately describe the global shape of the object. Also the number of rows and columns of the 2D array must be chosen in order to control the amount of global information. A decrease in the number of rows and columns will decrease the descriptiveness of the spin image since the amount of global shape included in the image is reduced, but it will also reduce the chance of clutter corrupting the spin image. Another parameter used in the spin image is the support angle, i.e. the maximum angle between the direction of the oriented point basis of a spin image and the surface normal of points that are allowed to contribute to the spin image. This parameter is used to limit the effect of self-occlusion (i.e. an object can occlude its backside) and of clutter during spin image matching.

A disadvantage of this type of spin image is the influence the direction of the normal has on the image itself. The effect of a deviation of the estimated normal relative to the exact normal, referred to as the surface normal error, on the spin image increases with increasing $\alpha$ and $\beta$ values. Consequently, a small angular deviation of the normal can yield a large difference in the spin image, resulting in incorrect point correspondences. This is an issue in cases where data is influenced by noise and/or scatter. A spherical coordinate system, i.e. using the coordinates $\rho$ and $\phi$ with $\rho$ the distance of the point to the oriented point p and $\phi$ the angle between the vector from the oriented point p to the point and the tangent plane P, would result in a constant effect of the surface normal error on the coordinate $\phi$ (and no effect on the coordinate $\rho$). As a result these spin images may be matched more robustly in case of surface normal error. But a consequence of the spherical coordinates is that the 3D volume of cells varies (i.e. the 3D volume of cells with fixed $\phi$ increases with increasing $\rho$ and the 3D volume of cells with fixed $\rho$ changes with a change in $\phi$), which would then complicate the spin image matching due to this non-uniform cell size. Due to the fact that the 3D volume of the cells varies with $\rho$ and $\phi$, it is impossible to generate a 2D array with uniform 3D volume. For the cylindrical coordinates the 3D volume of cells varies as well but the 3D volume only increases with increasing $\alpha$. Therefore cells with constant 3D volume can be generated easily by generating a 2D array with non-equidistant cells along the $\alpha$ axis.

Another disadvantage of this type of spin image is the fact that the spin image depends on the resolution of the initial object. Therefore, in order to have an adequate description of the object the initial object should be uniformly meshed with a sufficient number of points (i.e. a small edge length). Thus, in case of non-uniform surface sampling the surface of the object will have to be resampled (i.e. adding or removing points) in a first step before calculating the spin images. This dependency of the spin image on the resolution also implies that a very similar sampling is needed for the different surface representations of the object in order to obtain similar spin images for two corresponding points on these different instances (surface representations) of the object.

When using spin images it is important to choose the cell size in function of the resolution of the object representation and the noise level. A cell size smaller than the noise level or the resolution of the object representation will result in spin images that are really dependent on the noise on the particular mesh, while a larger cell size will result in spin images that are less influenced by the noise and the particular mesh. So it will be important to know in advance the noise level and the object resolution to determine the optimal cell size. This implies as well that the object resolution will have to be adapted (reduced or increased by applying a remeshing algorithm or removing/adding points) in order to match with the cell size needed based on the noise.

Noisy surface data limits the use of spin images due to their dependency on the surface normal, which cannot be accurately determined in those cases. A logical approach to limit the normal dependency could be to calculate multiple spin images in each point for different normal directions and use all these data for finding correspondences. Other logical approaches are applying a smoothing to the surface before determining the normal in the surface points, or quantifying the surface normal dependency and compensating the spin image for this by for instance averaging. All these solutions will result in increased calculation time and more false positive point matches. The method of the invention does not make use of the surface normal and as such is not influenced by noise limiting the accurate calculation of the surface normal.

SUMMARY OF THE INVENTION

An object of the present invention is to provide a method and system for automatically finding correspondences between two or more digital representations such as images of one or more 3D objects with an identical, partially identical or similar geometry. The method and system, devices and software have the advantage that although the different digital representations of the object may be influenced by either noise, or scatter, or occlusion, or clutter, or any combination of these, correspondence can be found. The present invention finds application in medical image processing such as in surgical planning especially in dental implantology.

The present invention provides a method for automatically finding correspondences between two or more digital representations of one or more 3D objects, e.g. with an identical, partially identical or similar geometry, the two or more digital representations of the one or more 3D objects comprising points, the method comprising:
  a set of points is defined for each of said digital representations in which shell images will be calculated
  shell images are calculated for each of said digital representations of said 3D objects
  comparing the shell images of one of the digital representation with the shell images of another of the digital representations, and
  indicating local correspondences between the digital representations based on a predefined criterion.

The calculation of shell images may be carried out:
  by defining a set of concentric spherically symmetric or sphere shells with as centre point one of the points of said set of points;
  by assigning to each of said concentric spherically symmetric or sphere shells a value based on the part of said digital representation enclosed by two consecutive spherically symmetric or sphere shells;
  by converting said spherically symmetric object or sphere shells to which a value has been assigned into an array containing said values.

The present invention also provides a computer based system for automatically finding correspondences between two or more digital representations of one or more 3D objects, e.g. with an identical, partially identical or similar geometry, the two or more digital representations of the one or more 3D objects comprising points, the system comprising:
  means for defining a set of points for each of said digital representations in which shell images will be calculated
  means for calculating shell images for each of said digital representations of said 3D objects
  means for comparing the shell images of one of the digital representation with the shell images of another of the digital representations, and
  means for indicating local correspondences between the digital representations based on a predefined criterion.

The present invention also provides a computer program product comprising code segments which when executed on a processing engine such as a computing system automatically finds correspondences between two or more digital representations of one or more 3D objects, e.g. with an identical, partially identical or similar geometry, the two or more digital representations of the one or more 3D objects comprising points which are loaded into the processing engine, the computer program product comprising:
  means for defining a set of points for each of said digital representations in which shell images will be calculated
  means for calculating shell images for each of said digital representations of said 3D objects
  means for comparing the shell images of one of the digital representation with the shell images of another of the digital representations, and means for indicating local correspondences between the digital representations based on a predefined criterion.

The means for calculating shell images includes:
  means for defining a set of concentric spherically symmetric or sphere shells with as centre point one of the points of said set of points;
  Means for assigning to each of said concentric spherically symmetric or sphere shells a value based on the part of said digital representation enclosed by two consecutive spherically symmetric or sphere shells;
  Means for converting said spherically symmetric or sphere shells to which a value has been assigned into an array containing said values.

An embodiment of the present invention provides a method, system or software adapted so that calculating shell images is:
  by defining a set of concentric spherically symmetric shells or sphere shells with as centre point one of the points of said set of points;
  by assigning to each of said concentric spherically symmetric shells or sphere shells a value based on the part of said digital representation enclosed by two consecutive spherically symmetric shells or sphere shells;
  by converting said spherically symmetric shells or sphere shells to which a value has been assigned into an array containing said values;

Preferably one digital representation of the two or more digital representations has a resolution that is higher than that of another digital representation.

For example, the two or more digital representations can be of a patient's jaw, including bone and dentition.

An embodiment of the present invention provides a method, system or software adapted so that the two or more digital representations are images imported into a dedicated software application running on a computer system.

Preferably a 3D model of the bone and teeth is generated based on image segmentation and volumetric meshing.

One of the two or more digital representations can be an indirect or direct high resolution image.

An embodiment of the present invention provides a method, system or software adapted to register/align the high-resolution image with the low resolution image.

An embodiment of the present invention provides a method, system or software adapted wherein the shell images are generated for a set of points defined in the low resolution and high resolution images.

For example, the shell images can be calculated for the set of points lying on a surface model and/or center points of voxels in a volumetric representation.

The shell image in a point can be calculated by defining a number of concentric spherically symmetric shells or spheres with as center point said point and different values for the radius.

The radii can be selected so that the shell surfaces of successive spherically symmetric shells or spheres are at a fixed distance, or that the magnitude of the area of the planar section through the center point in between two successive spherically symmetric shells or spheres is the same.

The values of the shell images can be normalised by dividing each area value by the magnitude of the area of the corresponding planar section through the center point of the spherically symmetric shell or sphere, or by dividing each volume value by the volume enclosed by two successive spherically symmetric shells or spheres.

An embodiment of the present invention provides a method, system or software adapted so that comparing the shell images for the two or more representations can comprise:
  the sum of the absolute value of the differences between the corresponding values of two 1D arrays are calculated as a measure for the similarity between the shell images.

For example comparing the shell images for the two or more representations, can comprise:
  A suitable distance such as the Euclidean distance is calculated between lists of values of the shell images, which are considered as points in the n dimensional space, whereby the smaller the Euclidean distance the better the correspondence between the shell images;

For example, comparing the shell images for the two or more representations can comprise:
  a linear correlation between the shell images is calculated as a measure for the similarity between two shell images.

In one embodiment corresponding values of 1D arrays of shell images are considered as points and the linear correlation fits a line through these points, wherein the linear correlation evaluates the correlation coefficient and also the slope of the fitted line and the slope is 1 in case of identical shell images. A value close to zero indicates a good similarity.

Defining a threshold value and all pairs of shell images with a value below said threshold value can be considered as shell images with good similarity.

For example, matching shell images are determined as shell images for which the relevant distance such as the Euclidean distance is lower than a predefined threshold value. In any of the embodiment means for changing the threshold value can be provided.

Optionally, the higher resolution image is an intra-oral scan. Preferably the intra-oral scan comprises two or more scans.

An embodiment of the present invention provides a method, system or software adapted for retracking, landmark detection, feature detection or for finding automatically a good starting position for surface alignment of two digital representations of an object.

An embodiment of the present invention provides a method, system or software adapted so that for each point of the object to be registered for which a shell image is calculated, the x best matching shell images are determined and the resulting point correspondences are saved, for each point on both objects the three inertia axes of the local 3D surface are calculated, for each possible point correspondence firstly a registration of the objects is done by aligning the inertia axes of the corresponding points and then performing a surface registration and secondly the registration is evaluated by calculating the least square distance (LSD) between both objects, and the registration with the smallest LSD is kept as the optimal registration.

An embodiment of the present invention provides a method, system or software adapted so that for each point of the object to be registered for which a shell image is calculated, the x best matching shell images are determined and the resulting point correspondences are saved, for each combination of 3 corresponding point pairs (only those containing 6 different points), a three-point registration is performed, followed by a surface registration and a calculation of the LSD between both objects, and the registration with the smallest LSD is kept as the optimal registration.

An embodiment of the present invention provides a method, system or software adapted so that for each point of the object to be registered for which a shell image is calculated, the x best matching shell images are determined and the resulting point correspondences are saved, for each combination of 3 corresponding point pairs (only those containing 6 different points), a three-point registration is performed, then for all other points of the registered surface for which a shell image was calculated and for which a list of x best matches was determined, the distance to the closest best match is determined, all these distances are summed and the set of 3 corresponding point pairs resulting in the lowest total distance is kept, a 3-point registration is performed based on this set of corresponding points, followed by a surface registration.

An embodiment of the present invention provides a method, system or software adapted so that for each point of the object to be registered for which a shell image is calculated, the x best matching shell images are determined and the resulting point correspondences are saved, for each combination of 3 corresponding point pairs (only those containing 6 different points), the transformation matrix for the 3-points registration is determined and the LSD between the 3 registered points is determined, if the LSD is smaller than a predefined threshold value the registration is considered to be a possible candidate, from the list of resulting transformation matrices, those that are similar are determined and the list of related points is used for performing a N-points registrations, followed by a surface registration using only the surface information of the shell images.

An embodiment of the present invention provides a method, system or software adapted so that for each point of the object to be registered for which a shell image is calculated, the x best matching shell images are determined and the resulting point correspondences are saved, for each point on both objects the three inertia axes of the local 3D surface are calculated, for each possible point correspondence firstly a registration is done of the local 3D surface of the first point of the correspondence onto the object of the second point of the correspondence, these registrations being evaluated by calculating the LSD distance between the local 3D surface and the object of the second point in the correspondence, whereby if the LSD is smaller than a predefined threshold value the transformation belonging to this registration is saved, from the resulting list of transformation matrices, those that are similar are determined and the list of related points is used for performing an N-points registration, followed by a surface registration using only the surface information of the shell images belonging to the transformations that were determined to be similar.

The registration or alignment technique that is object of this invention e.g. according to embodiments of the present invention as applied in systems, devices or implemented in software can be faster and can require less memory than the conventional registration algorithms since only limited information in a limited number of points is compared in order to find point correspondences.

The registration or alignment technique according to embodiments of the present invention can be less noise sensitive compared to conventional techniques due to the fact that only local geometry is used for finding point correspondences.

The registration or alignment technique that is object of this invention e.g. according to embodiments of the present invention has one or more of the following advantages compared to spin images:

Spin images are very sensitive to the sampling of the mesh and require a quasi identical sampling for both objects to be compared due to the use of vertices for the calculation of the spin images. This is not the case with the new registration technique according to embodiments of the present invention, since not point density but area or volume information is used. Hence a rough approximation of the 3D object can be compared with a detailed representation of the same 3D object, without need for resampling.

The resolution of the spin image grid must be well chosen and in function of the sampling resolution of the 3D object in order to have sufficiently descriptive spin images. This is not the case with the new registration technique according to embodiments of the present invention, since not point density but area or volume information is used.

Spin images are 2.5D representations of a 3D object while according to embodiments of the present invention, the novel technique results in a 1.5D description of the object, thus further reducing memory usage.

Shell images are less noise sensitive than spin images since the surface normal is not used.

Spin images are very sensitive to the fact that the points on one representation of the 3D object should be very close to those on the other representation in order to find good correspondences. As a result spin images must be calculated in a large set of points of both representations. Embodiments of the present invention are much less sensitive to this since the surface normal information is not used and since all local information is reduced to 1.5D instead of 2.5D. As a result a limited set of points can be used in order to look for point correspondences.

These and further objects, features and advantages of the invention will become apparent from the following detailed description wherein reference is made to the figures in the accompanying drawings.

DEFINITIONS

Shell images can be calculated for a set of points defined for 3D digital representations namely points lying on a surface model and/or center points of the voxels in a volumetric representation. The shell image in a point is calculated by defining a number of concentric spherically symmetric shells such as spheres with as center point said point and different values for the radius. The term "spherically symmetric" refers to not only a sphere but also to a polyhedron that has a large number of faces. By using a large number of faces the polyhedron can be made to approximate a sphere, e.g. 12 or more faces. Preferably the polyhedron is regular. The term "regular" means that all elements, e.g. vertices, edges, faces, or cells are indistinguishable such that there exists a group of rotational or mirror transformations that will bring the polyhedron into coverage with itself. In practice of the 5 known regular polyhedra, only the dodecahedron and the icosahedron have a large number of faces: with 12 and 20 faces respectively, and are relevant to the present application.

These radii can either be selected so that the shell surfaces of successive spherically symmetric shells or spheres are at a fixed distance, or that the magnitude of the area of the planar section through the center point in between two successive spherically symmetric shells such as spheres is identical, or in any other random or predefined way. A value representing the part of the 3D representation (e.g. magnitude of the area of the surface, the volume, point density, weighted volume, or the like or any combinations of these) of the object within the first sphere and in between each of two successive spherically symmetric shells such as spheres is calculated and assigned to each spherically symmetric shell, e.g. sphere. These values can be normalized; for example by dividing each area value by the magnitude of the area of the corresponding planar section through the center point of the spherically symmetric shell or sphere, or by dividing each volume value by the volume enclosed by two successive spherically symmetric shell or spheres. The resulting list of successive normalized values is referred to as the shell image of that point.

DETAILED DESCRIPTION OF THE INVENTION

The present invention will be described with respect to particular embodiments and with reference to certain drawings but the invention is not limited thereto but only by the claims. In the following the present invention will be described with respect to surgical planning such as used in dental implantology but the present invention is not limited thereto. Embodiments of the present invention find useful application in imaging techniques in which digital representations, e.g. 3D representations of an object must be aligned or registered.

Figure 4:
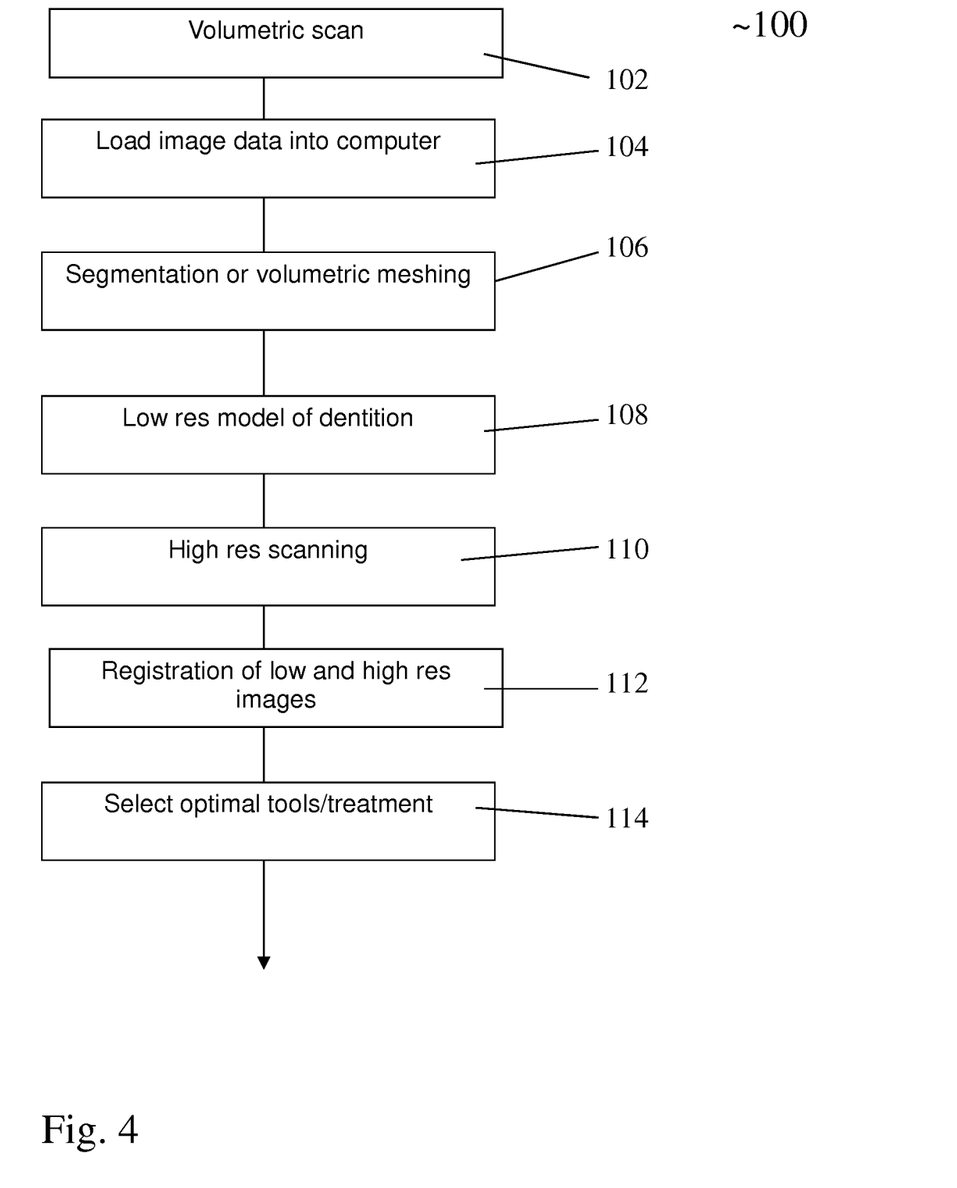
FIG. 4 is a flow diagram of a method according to an embodiment of the present invention.

With reference to FIG. 4, according to a preferred embodiment of a method 100 of the present invention a scan especially a volumetric scan such as a (CB)CT scan is taken of object in step 102 such as part of a human or animal body. Such a scan can be used in surgical planning. Other suitable scanning techniques include MRI and micro computed tomography. The scan can be made of a patient's jaw, including bone and dentition, e.g. in order to be used for dental treatment planning, e.g. computer guided implantology, orthognatic surgery . . . . The resulting digital images are imported in step 104 into a dedicated software application running on a computer system to allow the medical practitioner such as a dentist to virtually plan in 3D the optimal treatment, e.g. the optimal dental treatment. Based on image segmentation techniques and volumetric meshing techniques a 3D model of the bone and teeth is generated in step 106. This bone-tooth model contains the 3D shape of teeth but can be at low resolution due to the limited resolution of the scanner e.g. (CB)CT scanner itself and the partial volume effect. This model can be stored in memory. Moreover the (CB)CT images often contain scatter due to metallic fillings or metallic restorations of the teeth. This scatter must be manually removed, meaning that the user must visually interpret the grey value information and estimate the border of the teeth. In this manner in step 108, an approximate low resolution model of the body part such as the patient's dentition is made. This model can be stored in memory. In order to be able to include accurate information in the model of the body part, additional soft tissue information must be obtained and registered with the scanned images. For example to include accurate tooth information and mucosa information, a further high-resolution (scatter and distortion free) 3D model of the patient's body part such as the patient's dentition is obtained in step 110 and then in step 112 this new representation is registered within the (CB)CT images obtained in step 102. This further model can be stored in memory. In step 110 the body part such as the patient's dentition can be digitized at high-resolution by either direct or indirect techniques. This digitized body part can be stored in memory. The indirect techniques start from an impression taken of the patient's dentition which is then either digitized or used to pour a plaster model that is afterwards digitized. Different digitizing techniques exist, such as for example ($\mu$)CT scanning, optical scanning, or mechanical, tactile digitizing techniques. The direct techniques no longer start from an impression of the patient's dentition but directly digitize, i.e. intra-orally scanning, the patient's dentition. Several intra-oral scanning devices are already available on the market.

In step 112, the high-resolution 3D model of the body part such as the dentition must be registered/aligned with the scan based model, e.g. (CB)CT based model, e.g. the bone-tooth model. This registration can be stored in memory. Finally in step 114 the dental practitioner can carry out simulations or planning or any other activity on the registered models.

It is an object of the current invention that a registration technique based on shell images is used for this purpose in embodiments of the present invention. Step 112 will be described in more detail below as a method 200 shown schematically in FIG. 5.

Figure 5:
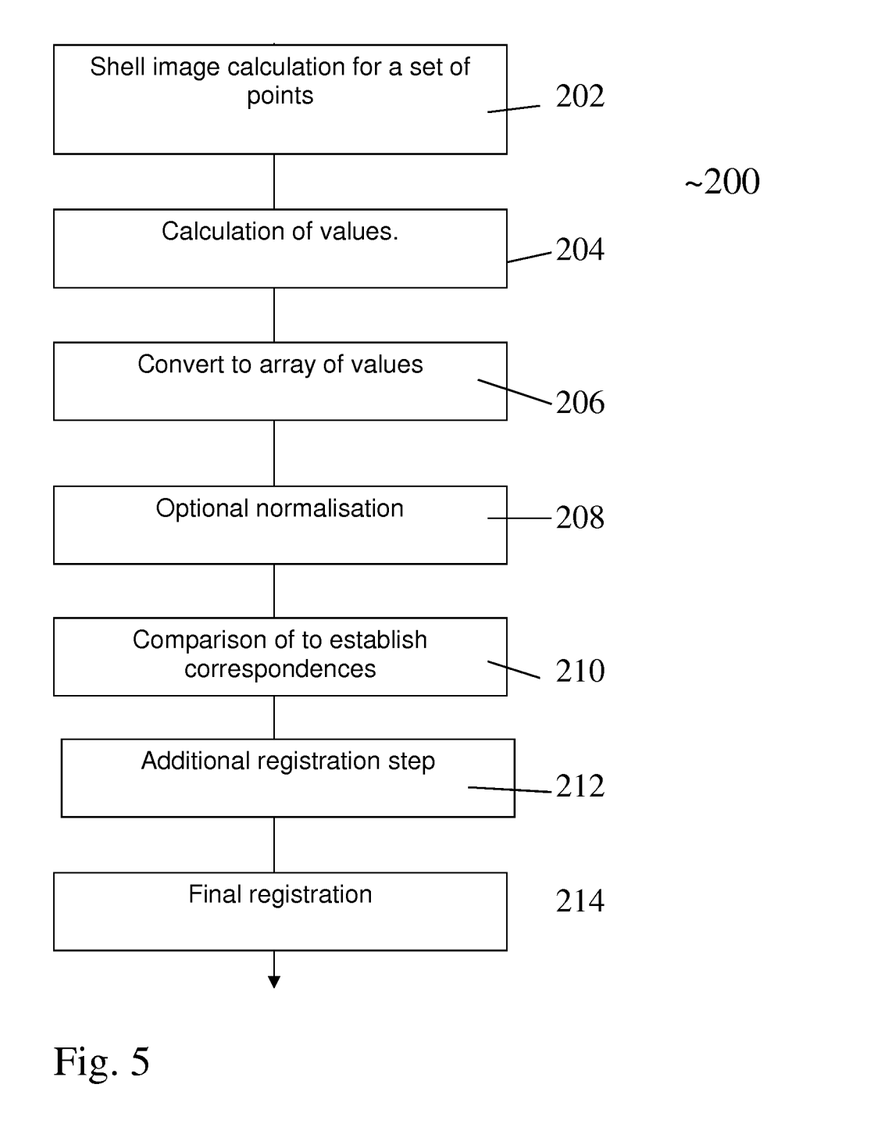
FIG. 5 is a further flow diagram of a method according to an embodiment of the present invention.

With reference to FIG. 5, in a first step 202 of a registration method 200, shell images are calculated for a set of points, e.g. a random set of points defined for the 3D representation for both 3D models, i.e. for the low resolution and high resolution models. For example, shell images are calculated for a set of points such as a random set of points defined for the 3D representation namely points lying on a surface model and/or center points of the voxels in a volumetric representation, and this for both 3D models. The shell image in a point is calculated by defining a number of concentric spherically symmetric shells or spheres with as center point said point and different values for the radius. These radii can either be selected so that the shell surfaces of successive spherically symmetric shells or spheres are at a fixed distance, or that the magnitude of the area of the planar section through the center point in between two successive spherically symmetric shells or spheres is identical, or in any other random or predefined way. In step 204 a value representing the part of the 3D representation (e.g. magnitude of the area of the surface, the volume, point density, weighted volume, or the like or any combinations of these) of the object within the first spherically symmetric shell or sphere and in between each of two successive spherically symmetric shells or spheres is calculated and assigned to each spherically symmetric shell or sphere. These values can be stored in memory. In a next step 206 these values are converted to an array. In step 208 said array of values can optionally be normalized; for example by dividing each area value by the magnitude of the area of the corresponding planar section through the center point of the spherically symmetric shell or sphere, or by dividing each volume value by the volume enclosed by two successive spherically symmetric shells or spheres. The resulting list of successive normalized values is referred to as the shell image of that point. This list can be stored in memory.

In a next step 210, i.e. after calculating the shell images for a set of points e.g. a random set of points of both 3D models using the same parameters (i.e. number of spherically symmetric shells or spheres (n) and values for the radii), the shell images are compared in order to establish point correspondences between points on one 3D model and points on the other 3D model. For comparing the shell images in step 210 different methods are possible, of which some examples are given below, each of which is included as an embodiment of the present invention.

- The sum of the absolute value of the differences between the corresponding values of two 1D arrays can be calculated and is a measure for the similarity between the shell images. A value close to zero indicates a good similarity. Thus in order to select matching shell images a threshold value must be defined and all pairs of shell images with a value below said threshold value are shell images with good similarity.
- A suitable distance such as the Euclidean distance can be calculated between the lists of values, which are considered as points in the n dimensional space. Normalizing the values is needed to limit the influence of the values in the outer spherical shells onto the Euclidean distance when comparing the shell images. The smaller the Euclidean distance the better the correspondence between the shell images, and ultimately a perfect correspondence occurs with a value of 0. Note that the shell images of different instances (e.g. optical scan versus (CB)CT scan) of the same object will not be exactly the same, therefore a small value for the Euclidean distance will indicate almost identical shell images. For example, this minimum distance can depend on the complexity of the shape of the 3D model. For a planar shape the Euclidean distance between corresponding shell images of the high and low resolution model will be very small or even zero in the ideal situation, while for a highly curved shape the Euclidean distance between corresponding shell images will be larger. So the threshold value will depend on the application, i.e. the typical shape of the 3D model. The threshold value will also depend on the radii and number of spheres used for calculating the shell images. In any of the embodiments of the present invention a means for changing the threshold value is provided.
- Thus matching shell images are shell images for which the relevant distance such as the Euclidean distance is lower than a predefined threshold value.
- The linear correlation between the shell images can be calculated as a measure for the similarity between two shell images. Therefore, the corresponding values of the 1D arrays (i.e. shell images) are considered as points and a line is fitted through these points. In case of identical shell images the line will have a slope of 1 and a linear correlation coefficient of 1. So matching shell images are filtered based on a high value for the linear correlation coefficient and a value close to 1 for the slope.

Other methods for finding matches are included within the scope of the present invention or any combination of these can be used.

Points with 'identical' shell images could be 'identical' points on the object, but not necessarily. Comparing shell images can result in false positives and false negatives. The relevant parameter for the shell images (e.g. number of spheres and radii) is preferably optimized with respect to the type of application in order to minimize the number of false positives and/or false negatives, however in accordance with the present invention it is not necessary or even possible sometimes to avoid these completely. The threshold criterion is used to identify 'identical' points on the object. The threshold criterion naturally includes a tolerance and the larger this tolerance the greater the chance of identifying false positives. In any of the embodiments of the present invention a means for changing the threshold value is provided.

It is possible that 'identical' shell images are found for non-corresponding points, for example in case the 3D shape of the surface locally around the respective points is very similar. Therefore additional registration techniques are preferably required to find the optimal alignment of one object to the other in step 212. Some of the preferred options are listed below each of which or any a combination of which is an embodiment of the present invention:

- For each point of the object to be registered for which a shell image is calculated, the x best matching shell images are determined and the resulting point correspondences are saved. For each point on both objects the three inertia axes of the local 3D surface are calculated. For each possible point correspondence firstly a registration of the objects is done by aligning the inertia axes of the corresponding points and then performing a surface registration and secondly the registration is evaluated by calculating the least square distance (LSD) between both objects. Finally the registration with the smallest LSD is kept as the optimal registration.
- For each point of the object to be registered for which a shell image is calculated, the x best matching shell images are determined and the resulting point correspondences are saved. For each combination of 3 corresponding point pairs (only those containing 6 different points), a three-point registration is performed, followed by a surface registration and a calculation of the LSD between both objects. Finally the registration with the smallest LSD is kept as the optimal registration.
- For each point of the object to be registered for which a shell image is calculated, the x best matching shell images are determined and the resulting point correspondences are saved. For each combination of 3 corresponding point pairs (only those containing 6 different points), a three-point registration is performed. Then for all other points of the registered surface for which a shell image was calculated and for which a list of x best matches was determined, the distance to the closest best match is determined. All these distances are summed and the set of 3 corresponding point pairs resulting in the lowest total distance is kept. Finally a 3-point registration is performed based on this set of corresponding points, followed by a surface registration.
- For each point of the object to be registered for which a shell image is calculated, the x best matching shell images are determined and the resulting point correspondences are saved. For each combination of 3 corresponding point pairs (only those containing 6 different points), the transformation matrix for the 3-points registration is determined and the LSD between the 3 registered points is determined. If the LSD is smaller than a predefined threshold value the registration is considered to be a possible candidate. From the list of resulting transformation matrices, those that are similar are determined and the list of related points is used for performing a N-points registrations, followed by a surface registration using only the surface information of the shell images.

Registration techniques can be merged or combined, for example the following technique is a combination of the first and last additional registration techniques above. For each point of the object to be registered for which a shell image is calculated, the x best matching shell images are determined and the resulting point correspondences are saved. For each point on both objects the three inertia axes of the local 3D surface are calculated. For each possible point correspondence firstly a registration is done of the local 3D surface of the first point of the correspondence onto the object of the second point of the correspondence. These registrations are evaluated by calculating the LSD distance between the local 3D surface and the object of the second point in the correspondence. If the LSD is smaller than a predefined threshold value the transformation belonging to this registration is saved. From the resulting list of transformation matrices, those that are similar are determined and the list of related points is used for performing an N-points registration, followed by a surface registration using only the surface information of the shell images belonging to the transformations that were determined to be similar.

Any combination of one or more of the above-mentioned registration options could be used as well and is an embodiment of the present invention. So any possible method and/or combination of ordering, filtering and grouping the point correspondences based on the shell images in order to compute the plausible transformation(s) for the registration of one object to the other can be used either as the final registration or as a start point for optimization using other state-of-the-art registration techniques in step 214. The resulting registration can be stored in memory.

According to another preferred embodiment of the invention in step 110 an intra-oral scan (e.g. optical scan) is made of the patient's lower and upper dentition, resulting in two digital 3D models, i.e. one of the upper and one of the lower dentition. Also an intra-oral side scan (e.g. optical scan) is made of the patient's dentition while in occlusion in order to be able to position the digital 3D models of lower and upper dentition virtually in occlusion. The side scan mainly contains the buccal/labial surfaces of the upper and lower dentition. The digital 3D models of the separate dentitions must be registered automatically and within acceptable time onto this side scan, which only contains a partial view of the upper and lower dentition respectively. It is important to have a real-time fully automated registration process in order to be able to give immediate feedback while taking this intra-oral side scan. As such the user is informed whether the side scan taken suits its purpose, i.e. contains sufficient surface information for alignment of the upper and lower dentition. Therefore shell images are calculated for a random set of points for each of the 3D models of the separate dentitions. While taking the side-scan shell images are calculated and compared with those of the separate dentitions to find the matches. Once possible correspondences are found additional registration techniques are used in order to register the separated 3D models onto the side scan.

According to another preferred embodiment of the invention shell images are used for the purpose of retracking, typically needed for intra-oral scanning (e.g. optical scanning). An intra-oral scanning device is typically a hand-held scanning unit that has a small range in which the object's surface can be digitized. This means that the head of the scanner, i.e. the capturing unit, must be on the one hand at a minimum distance from the surface of the object to be digitized and on the other hand within a maximum distance in order to be able to measure the distance to the object's surface. Based on this distance measurement points are generated that lie on the object's surface. When during scanning the handheld probe is not within this distance range, no data is captured, which is referred to as losing track. In order to restart the scanning the probe must be brought back within this distance range, but at that moment it is not known in which area of the object new data is captured. Therefore a retracking algorithm is needed to find this position on the already scanned surface in a limited time. The retracking problem is in fact a registration problem of a small surface (i.e. new scan data) onto a large surface (i.e. already scanned surface) which is typically characterized by noisy and only partially overlapping (i.e. identical) surfaces. Therefore shell images are generated for a random set of points on the already scanned surface and for a random set of points on the newly scanned area. These shell images are compared and the matches are determined. In order to find the correct position for the newly scanned area the inertia axes are calculated for the corresponding points of the shell image matches, and the surfaces are registered by means of these inertia axes. Then a local surface registration is performed and the LSD is calculated. The registration (thus position) resulting in the lowest LSD value is considered as the correct position and the standard scan process can be continued as long as track is not lost again.

According to another preferred embodiment the shell images are used for the purpose of finding automatically a good starting position for the surface alignment of two digital representations of an object. This process is currently typically done by user interaction, e.g. by indication matching points on both instances or by manually translating and rotating one instances so that it visually coincides with the other instance.

According to an illustrative embodiment the invention is used for landmark detection. Therefore a generic 3D model of an anatomical structure with landmarks is available. In the landmarks a shell image is created. For the patient specific 3D model on which the landmarks must be identified a random set of points is selected for which shell images are calculated. These are compared with those of the landmark points of the generic model in order to identify possible matches between the landmark points and the points on the patient specific 3D model. As such the corresponding landmark points on the patient specific 3D model are defined. An optimization can be done in order to fine tune the corresponding landmark points, by for instance calculating the shell image for points closely to the initially identified point and compare these with the shell image of the matched landmark point. The point with the highest correspondence is kept as final landmark point.

According to yet another illustrative embodiment the invention is used for feature recognition. A generic 3D model of an object with certain profound features exists and said features must be identified in the 3D representation of another object. Therefore a set of points at the location of the feature(s) in the generic model is selected and shell images are generated for said points. The parameters of the shell images (number of spherically symmetric shells or spheres and radii) are selected in such a way that only the local feature is described by the shell image. For the object in which said feature(s) must be recognized shell images with the same parameters are calculated for a large set of points, distributed over the object. These shell images are compared with the ones of the generic model in order to find point correspondences and as such plausible locations (i.e. points) on the object for the feature(s) to be detected. Another registration criterion is used for verifying the plausible candidates and identifying said feature(s).

Figure 6:
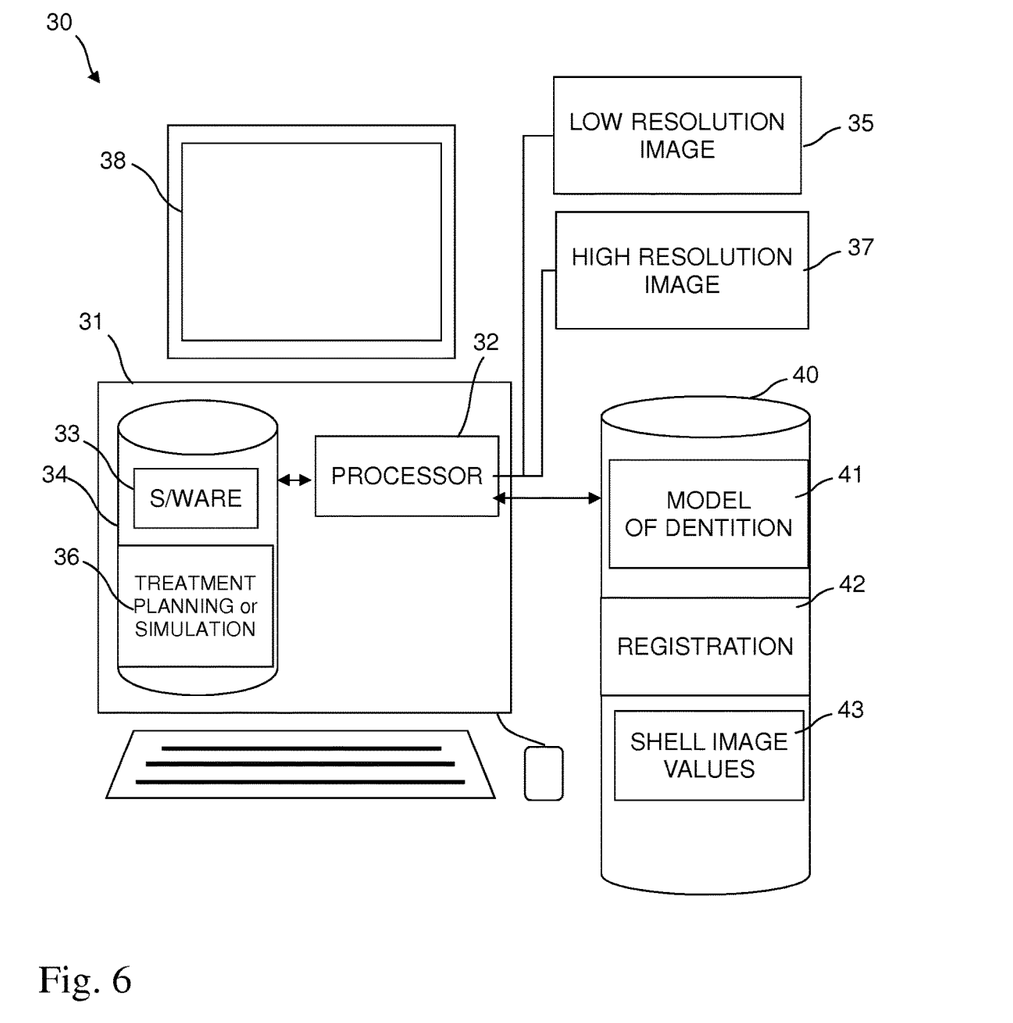
FIG. 6 is a schematic representation of a computer system according to an embodiment of the present invention.

Methods and systems according to embodiments of the present invention can be implemented on computer equipment that is adapted to implement methods of the present invention. A schematic representation of such a computer system 30 is shown in FIG. 6 which includes a computer 31 with a processor 32 and memory and preferably a display. The computer 31 can have means for generating and visualizing a 3D model. For achieving this, an input device can be provided for inputting data for the 3D model, e.g. from a storage device such as a CD-ROM, or solid state memory or via a network link, e.g. via a LAN or WAN.

The method can be implemented on a computer 31 by providing software 33, e.g. as well as a module 36 that when run on a computer allows uploading, storing and processing of images such as for surgical planning, e.g. dental planning of a treatment on the generated 3D model. It also allows selecting or determining of an approach, e.g. the best approach for the treatment.

The computer 31 can comprise a processor 32 and a memory 34, 40 which stores data and also machine-readable instructions which, when executed by the processor cause the processor to perform the described methods. A computing system which can be utilized with the methods of the present invention may run computer programs such as 3-Matic™ as supplied by Materialise N.V., Leuven, Belgium. The computer may include a video display terminal, a data input means such as a keyboard, and a graphic user interface indicating means such as a mouse. The computer may be implemented as a general purpose computer, e.g. a UNIX workstation or a personal computer.

The computer 31 typically includes a Central Processing Unit ("CPU"), such as a conventional microprocessor of which a Pentium processor supplied by Intel Corp. USA is only an example, and a number of other units interconnected via bus system. The bus system may be any suitable bus system. The computer includes at least one memory. Memory may include any of a variety of data storage devices known to the skilled person such as random-access memory ("RAM"), read-only memory ("ROM"), and non-volatile read/write memory such as a hard disc as known to the skilled person. For example, the computer may further include random-access memory ("RAM"), read-only memory ("ROM"), as well as a display adapter for connecting the system bus to a video display terminal, and an optional input/output (I/O) adapter for connecting peripheral devices (e.g., disk and tape drives) to the system bus. The video display terminal can be the visual output of computer, and can be any suitable display device such as a CRT-based video display well-known in the art of computer hardware. However, with a desk-top computer, a portable or a notebook-based computer, the video display terminal can be replaced with a LCD-based or a gas plasma-based flat panel display. The computer further includes an user interface adapter for connecting a keyboard, mouse, and optional speaker.

The computer can also include a graphical user interface that resides within machine-readable media to direct the operation of the computer. Any suitable machine-readable media may retain the graphical user interface, such as a random access memory (RAM), a read-only memory (ROM), a magnetic diskette, magnetic tape, or optical disk (the last three being located in disk and tape drives). Any suitable operating system and associated graphical user interface (e.g., Microsoft Windows, Linux) may direct CPU. In addition, computer includes a control program that resides within computer memory storage. Control program contains instructions that when executed on CPU allow the computer to carry out the operations described with respect to any of the methods of the present invention.

The graphical user interface is used to visualize the 3D model of the dentition/teeth to be treated. It can also be used for planning and/or simulating the treatment on the generated 3D model.

Those skilled in the art will appreciate that other peripheral devices such as optical disk media, audio adapters, or chip programming devices, such as PAL or EPROM programming devices well-known in the art of computer hardware, and the like may be utilized in addition to or in place of the hardware already described.

The computer program product for carrying out the method of the present invention can reside in any suitable memory and the present invention applies equally regardless of the particular type of signal bearing media used to actually store the computer program product. Examples of computer readable signal bearing media include: recordable type media such as floppy disks and CD ROMs, solid state memories, tape storage devices, magnetic disks.

Accordingly, the present invention also includes a software product which when executed on a suitable computing device carries out any of the methods of the present invention. Suitable software can be obtained by programming in a suitable high level language such as C and compiling on a suitable compiler for the target computer processor. Such methods will now be described.

The computer system and suitable software (e.g. adapted for running on the computer system, e.g. by being stored in memory and being executed on a processor) according to embodiment of the present invention can have means for uploading of a scan especially a volumetric scan such as a (CB)CT scan 35 of an object. The scan can be uploaded from a suitable signal storage device such as an optical disk (e.g. CD-ROM, DVD-ROM), magnetic disk (e.g. harddrive), magnetic tape, solid state memory or from a network such as a LAN or directly from the scanner. The computer system is provided with a suitable reader or interface to allow such uploading. This scan 35 can be stored in memory 34, 40 as a digital representation. The scan can be made of a patient's jaw, for example, including bone and dentition, e.g. in order to be used for dental treatment planning, e.g. computer guided implantology, orthognatic surgery . . . . The computer system is adapted with means to import the resulting images into a dedicated software application running on the computer system to allow the medical practitioner such as a dentist to virtually plan in 3D the optimal treatment, e.g. the optimal dental treatment. The computer system can have suitable treatment planning or simulation software 36 (e.g. SimPlant software supplied by Materialise Dental N.V., Leuven, Belgium). The computer system, and software for running thereon, is adapted to include means for image segmentation techniques and volumetric meshing techniques and is also adapted to include means to generate a 3D model of the body part such as the bone and teeth using such image segmentation techniques and volumetric meshing techniques. This bone-tooth model contains the 3D shape of teeth but can be at low resolution due to the limited resolution of the scanner e.g. (CB)CT scanner itself and the partial volume effect. This model can be stored in memory as model 41. Moreover the (CB)CT images often contain scatter due to metallic fillings or metallic restorations of the teeth. The computer system, and software for running thereon, can be adapted to allow this scatter to be removed manually by removal means, meaning that the user must visually interpret the grey value information and estimate the border of the teeth. In this manner, an approximate low resolution model of the body part such as the patient's dentition is made. This model can be stored in memory. In order to be able to include accurate information in the final model of the body part, additional information such as soft tissue information must be obtained and registered with the scanned images. For example to include accurate tooth information and mucosa information, a further high-resolution (scatter and distortion free) 3D model of the patient's body part such as the patient's dentition is uploaded or generated and the computer system is adapted to register this high resolution image within the low resolution (e.g. (CB)CT) images. To allow the uploading and registration the body part such as the patient's dentition can be digitized at high-resolution by either direct or indirect techniques as described above to generate a high resolution image 37. This high resolution representation can be stored in memory.

The computer system, and software for running thereon, is adapted with means to register/align the high-resolution 3D model of the body part such as the dentition with the scan based model, e.g. (CB)CT based model, e.g. the bone-tooth model. The registration 42 can be stored in memory. In accordance with embodiments of the present invention, the computer system, and software for running thereon, is adapted so that a registration technique based on shell images is used for this purpose in embodiments of the present invention.

The computer system, and software for running thereon, is adapted to carry out a first step in which shell images are calculated for a set of points, e.g. a random set of points defined for the 3D representation for both 3D models, i.e. for the low resolution and high resolution models. These shell images can be stored in memory. For example, the computer system, and software for running thereon, is adapted to calculate shell images for a set of points such as a random set of points defined for the 3D representations. These points can be points lying on a surface model and/or center points of the voxels in a volumetric representation, and this for both 3D models. The computer system, and software for running thereon, can be adapted so that the shell image in a point is calculated by defining a number of concentric spherically symmetric shells or spheres with as center point said point and different values for the radius, e.g. using the processor. These radii can either be selected so that the shell surfaces of successive spherically symmetric shells or spheres are at a fixed distance, or that the magnitude of the area of the planar section through the center point in between two successive spherically symmetric shells or spheres is identical, or in any other random or predefined way. The computer system, and software for running thereon, is adapted to calculate a value representing the part of the 3D representation (e.g. magnitude of the area of the surface, the volume, point density, weighted volume, or the like or any combinations of these) of the object within the first spherically symmetric shell or sphere and in between each of two successive spherically symmetric shells or spheres and to assign this value to each spherically symmetric shell or sphere. These values 43 can be stored in memory. In a next step these values can be converted to an array. The array of values can optionally be normalized; for example by dividing each area value by the magnitude of the area of the corresponding planar section through the center point of the spherically symmetric shell or sphere, or by dividing each volume value by the volume enclosed by two successive spherically symmetric shells or spheres. The resulting list of successive normalized values is referred to as the shell image of that point. This list can be stored in memory.

The computer system, and software for running thereon, is adapted so that in a second step, i.e. after calculating the shell images for a set of points e.g. a random set of points of both 3D models using the same parameters (i.e. number of spherically symmetric shells or spheres (n) and values for the radii), the shell images are compared in order to establish point correspondences between points on one 3D model and points on the other 3D model. For comparing the shell images, the computer system, and software for running thereon, can be adapted to use different methods, of which some examples are given below, each of which is included as an embodiment of the present invention.

The sum of the absolute value of the differences between the corresponding values of two 1D arrays can be calculated and is a measure for the similarity between the shell images. A value close to zero indicates a good similarity. Thus in order to select matching shell images a threshold value must be defined and all pairs of shell images with a value below said threshold value are shell images with good similarity.

A suitable distance such as the Euclidean distance can be calculated between the lists of values, which are considered as points in the n dimensional space. Normalizing the values is needed to limit the influence of the values in the outer spherical shells onto the Euclidean distance when comparing the shell images. The smaller the Euclidean distance the better the correspondence between the shell images, and ultimately a perfect correspondence occurs with a value of 0. Note that the shell images of different instances (e.g. optical scan versus (CB)CT scan) of the same object will not be exactly the same, therefore a small value for the Euclidean distance will indicate almost identical shell images. Thus matching shell images are shell images for which the relevant distance such as the Euclidean distance is lower than a predefined threshold value. In any of the embodiments, the computer system, and software for running thereon, can be adapted to allow changing the threshold value.

The linear correlation between the shell images can be calculated as a measure for the similarity between two shell images. Therefore, the corresponding values of the 1D arrays (i.e. shell images) are considered as points and a line is fitted through these points. In case of identical shell images the line will have a slope of 1 and a linear correlation coefficient of 1. So matching shell images are filtered based on a high value for the linear correlation coefficient and a value close to 1 for the slope.

Other methods for finding matches are included within the scope of the present invention or any combination of these can be used.

Points with 'identical' shell images could be 'identical' points on the object, but not necessarily. It is possible that 'identical' shell images are found for non-corresponding points, for example in case the 3D shape of the surface locally around the respective points is very similar. Therefore, it is preferred if the computer system, and software for running thereon, is adapted to use additional registration techniques to find the optimal alignment of one object to the other. Some of the preferred options are listed below each of which or any a combination of which is an embodiment of the present invention:

For each point of the object to be registered for which a shell image is calculated, the x best matching shell images are determined and the resulting point correspondences are saved. For each point on both objects the three inertia axes of the local 3D surface are calculated. For each possible point correspondence firstly a registration of the objects is done by aligning the inertia axes of the corresponding points and then performing a surface registration and secondly the registration is evaluated by calculating the least square distance (LSD) between both objects. Finally the registration with the smallest LSD is kept as the optimal registration.

For each point of the object to be registered for which a shell image is calculated, the x best matching shell images are determined and the resulting point correspondences are saved. For each combination of 3 corresponding point pairs (only those containing 6 different points), a three-point registration is performed, followed by a surface registration and a calculation of the LSD between both objects. Finally the registration with the smallest LSD is kept as the optimal registration.

For each point of the object to be registered for which a shell image is calculated, the x best matching shell images are determined and the resulting point correspondences are saved. For each combination of 3 corresponding point pairs (only those containing 6 different points), a three-point registration is performed. Then for all other points of the registered surface for which a shell image was calculated and for which a list of x best matches was determined, the distance to the closest best match is determined. All these distances are summed and the set of 3 corresponding point pairs resulting in the lowest total distance is kept. Finally a 3-point registration is performed based on this set of corresponding points, followed by a surface registration.

For each point of the object to be registered for which a shell image is calculated, the x best matching shell images are determined and the resulting point correspondences are saved. For each combination of 3 corresponding point pairs (only those containing 6 different points), the transformation matrix for the 3-points registration is determined and the LSD between the 3 registered points is determined. If the LSD is smaller than a predefined threshold value the registration is considered to be a possible candidate. From the list of resulting transformation matrices, those that are similar are determined and the list of related points is used for performing a N-points registrations, followed by a surface registration using only the surface information of the shell images.

Registration techniques can be merged or combined, for example the following technique is a combination of the first and last additional registration techniques above. For each point of the object to be registered for which a shell image is calculated, the x best matching shell images are determined and the resulting point correspondences are saved. For each point on both objects the three inertia axes of the local 3D surface are calculated. For each possible point correspondence firstly a registration is done of the local 3D surface of the first point of the correspondence onto the object of the second point of the correspondence. These registrations are evaluated by calculating the LSD distance between the local 3D surface and the object of the second point in the correspondence. If the LSD is smaller than a predefined threshold value the transformation belonging to this registration is saved. From the resulting list of transformation matrices, those that are similar are determined and the list of related points is used for performing an N-points registration, followed by a surface registration using only the surface information of the shell images belonging to the transformations that were determined to be similar.

The computer system according to the present invention, and software for running thereon, may use any combination of one or more of the above-mentioned registration options. So any possible method and/or combination of ordering, filtering and grouping the point correspondences based on the shell images in order to compute the plausible transformation(s) for the registration of one object to the other can be used either as the final registration or as a start point for optimization using other state-of-the-art registration techniques in step 214.

The computer system, and software for running thereon, can be adapted in another embodiment to upload and use an intra-oral scan (e.g. optical scan) made of the patient's lower and upper dentition, resulting in two digital 3D models, i.e. one of the upper and one of the lower dentition. Also an intra-oral side scan (e.g. optical scan) can be made of the patient's dentition while in occlusion in order to be able to position the digital 3D models of lower and upper dentition virtually in occlusion. The side scan mainly contains the buccal/labial surfaces of the upper and lower dentition. The digital 3D models of the separate dentitions must be registered automatically and within acceptable time onto this side scan, which only contains a partial view of the upper and lower dentition respectively. It is important to have a real-time fully automated registration process in order to be able to give immediate feedback while taking this intra-oral side scan. As such the user is informed whether the side scan taken suits its purpose, i.e. contains sufficient surface information for alignment of the upper and lower dentition. Therefore shell images are calculated for a random set of points for each of the 3D models of the separate dentitions. While taking the side-scan shell images are calculated and compared with those of the separate dentitions to find the matches. Once possible correspondences are found additional registration techniques are used in order to register the separated 3D models onto the side scan.

According to another preferred embodiment of the invention the computer system, and software for running thereon, can be adapted to use shell images for the purpose of retracking, typically needed for intra-oral scanning (e.g. optical scanning). An intra-oral scanning device is typically a hand-held scanning unit that has a small range in which the object's surface can be digitized. This means that the head of the scanner, i.e. the capturing unit, must be on the one hand at a minimum distance from the surface of the object to be digitized and on the other hand within a maximum distance in order to be able to measure the distance to the object's surface. Based on this distance measurement points are generated that lie on the object's surface. When during scanning the handheld probe is not within this distance range, no data is captured, which is referred to as losing track. In order to restart the scanning the probe must be brought back within this distance range, but at that moment it is not known in which area of the object new data is captured. Therefore a retracking algorithm is needed to find this position on the already scanned surface in a limited time. The retracking problem is in fact a registration problem of a small surface (i.e. new scan data) onto a large surface (i.e. already scanned surface) which is typically characterized by noisy and only partially overlapping (i.e. identical) surfaces. Therefore shell images are generated for a random set of points on the already scanned surface and for a random set of points on the newly scanned area. These shell images are compared and the matches are determined. In order to find the correct position for the newly scanned area the inertia axes are calculated for the corresponding points of the shell image matches, and the surfaces are registered by means of these inertia axes. Then a local surface registration is performed and the LSD is calculated. The registration (thus position) resulting in the lowest LSD value is considered as the correct position and the standard scan process can be continued as long as track is not lost again.

According to another preferred embodiment of the invention the computer system, and software for running thereon, can be adapted to use shell images for the purpose of finding automatically a good starting position for the surface alignment of two digital representations of an object. This process is currently typically done by user interaction, e.g. by indication matching points on both instances or by manually translating and rotating one instances so that it visually coincides with the other instance.

According to another preferred embodiment of the invention the computer system, and software for running thereon, can be adapted to, provide landmark detection. Therefore a generic 3D model of an anatomical structure with landmarks is available. In the landmarks a shell image is created. For the patient specific 3D model on which the landmarks must be identified a random set of points is selected for which shell images are calculated. These are compared with those of the landmark points of the generic model in order to identify possible matches between the landmark points and the points on the patient specific 3D model. As such the corresponding landmark points on the patient specific 3D model are defined. An optimization can be done in order to fine tune the corresponding landmark points, by for instance calculating the shell image for points closely to the initially identified point and compare these with the shell image of the matched landmark point. The point with the highest correspondence is kept as final landmark point.

According to another preferred embodiment of the invention the computer system, and software for running thereon, can be adapted to be used for feature recognition. A generic 3D model of an object with certain profound features exists and said features must be identified in the 3D representation of another object. Therefore a set of points at the location of the feature(s) in the generic model is selected and shell images are generated for said points. The parameters of the shell images (number of spherically symmetric shells or spheres and radii) are selected in such a way that only the local feature is described by the shell image. For the object in which said feature(s) must be recognized shell images with the same parameters are calculated for a large set of points, distributed over the object. These shell images are compared with the ones of the generic model in order to find point correspondences and as such plausible locations (i.e. points) on the object for the feature(s) to be detected. Another registration criterion is used for verifying the plausible candidates and identifying said feature(s).

The software described above may be stored on a signal storage medium, e.g. an optical storage medium such as a CD-ROM or a DVD-ROM, a magnetic tape, a magnetic disk, a diskette, a solid state memory etc.

Modifications and other embodiments of the disclosed invention will come to mind to one skilled in the art having the benefit of the teachings presented in the foregoing descriptions and the associated drawings. Therefore, it is to be understood that the invention is not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method for automatically finding correspondences between two or more digital representations of one or more 3D objects, with an identical, partially identical or similar geometry, the two or more digital representations of the one or more 3D objects comprising points, the method comprising:
    defining a set of points for each of said digital representations in which shell images will be calculated;
    calculating said shell images for each of said digital representations of said 3D objects;
    comparing the shell images of one of the digital representation with the shell images of another of the digital representations;
    indicating local correspondences between the digital representations based on a predefined criterion;
    wherein calculating shell images comprises:
        defining a set of concentric spherically symmetric shells or sphere shells with as centre point one of the points of said set of points;
        assigning to each of said concentric spherically symmetric shells or sphere shells a value based on the part of said digital representation enclosed by two consecutive spherically symmetric shells or sphere shells;
        converting said spherically symmetric shells or sphere shells to which a value has been assigned into an array containing said values; the value representing the part of the representations of said 3D objects of the object within the first sphere and in between each of two successive spherically symmetric shells or sphere shells being calculated as a volume or weighted volume, and assigned to each spherically symmetric shell.

2. The method of claim 1 wherein one digital representation of the two or more digital representations is selected from:
    an image having a resolution that is higher than that of another digital representation, and an indirect or direct higher resolution image.

3. The method of claim 1 wherein the two or more digital representations are selected from:
    a patient's jaw, including bone and dentition, and
    images imported into a dedicated software application running on a computer system.

4. The method of claim 3, wherein a 3D model of the bone and teeth is generated based on image segmentation and volumetric meshing.

5. The method of claim 2 further comprising registering/aligning the higher-resolution image with a lower resolution image.

6. The method of claim 1 wherein the shell images are selected from:
   shell images generated for a set of points defined in low resolution and high resolution images, and
   shell images calculated for the set of points lying on a surface model and/or center points of voxels in a volumetric representation.

7. The method according to claim 6 wherein the shell image in a point is calculated by defining a number of concentric spherically symmetric shells or spheres with as center point said point and different values for the radius.

8. The method according to claim 7 wherein the radii are selected so that the shell surfaces of successive spherically symmetric shells or spheres are at a fixed distance, or that the magnitude of the area of the planar section through the center point in between two successive spherically symmetric shells or spheres is the same.

9. The method of claim 8 wherein values of the shell images are normalized by dividing each area value by the magnitude of the area of the corresponding planar section through the center point of the spherically symmetric shell or sphere, or by dividing each volume value by the volume enclosed by two successive spherically symmetric shells or spheres.

10. The method of claim 1 comprising comparing the shell images for the two or more representations, wherein the comparing is selected from
    the sum of the absolute value of the differences between the corresponding values of two 1D arrays are calculated as a measure for the similarity between the shell images, and
    a suitable distance such as the Euclidean distance is calculated between lists of values of the shell images, which are considered as points in n dimensional space, whereby the smaller the Euclidean distance the better the correspondence between the shell images, and
    a linear correlation between the shell images is calculated as a measure for the similarity between two shell images.

11. The method of claim 10 wherein corresponding values of 1D arrays of shell images are considered as points and the linear correlation fits a line through these points, wherein the linear correlation evaluates the correlation coefficient and also the slope of the fitted line and the slope is 1 in case of identical shell images.

12. The method of claim 10 further comprising defining a threshold value and all pairs of shell images with a value below said threshold value are shell images with good similarity.

13. The method of claim 10 wherein matching shell images are determined as shell images for which the relevant distance such as the Euclidean distance is lower than a predefined threshold value.

14. The method of claim 1 wherein the higher resolution image is one or more intra-oral scans.

15. The method according to any claim 1 for retracking, landmark detection, feature detection or for finding automatically a good starting position for surface alignment of two digital representations of an object.

16. The method according to claim 1, wherein a step of registering points of the object is selected from:
    for each point of the object to be registered for which a shell image is calculated, the x best matching shell images are determined and the resulting point correspondences are saved, for each point on both objects the three inertia axes of the local 3D surface are calculated, for each possible point correspondence firstly a registration of the objects is done by aligning the inertia axes of the corresponding points and then performing a surface registration and secondly the registration is evaluated by calculating the least square distance (LSD) between both objects, and the registration with the smallest LSD is kept as the optimal registration, and
    for each point of the object to be registered for which a shell image is calculated, the x best matching shell images are determined and the resulting point correspondences are saved, for each combination of 3 corresponding point pairs (only those containing 6 different points), a three-point registration is performed, followed by a surface registration and a calculation of the LSD between both objects, and the registration with the smallest LSD is kept as the optimal registration, and
    for each point of the object to be registered for which a shell image is calculated, the x best matching shell images are determined and the resulting point correspondences are saved, for each combination of 3 corresponding point pairs (only those containing 6 different points), a three-point registration is performed, then for all other points of the registered surface for which a shell image was calculated and for which a list of x best matches was determined, the distance to the closest best match is determined, all these distances are summed and the set of 3 corresponding point pairs resulting in the lowest total distance is kept, the 3-point registration is performed based on this set of corresponding points, followed by a surface registration, and
    for each point of the object to be registered for which a shell image is calculated, the x best matching shell images are determined and the resulting point correspondences are saved, for each combination of 3 corresponding point pairs (only those containing 6 different points), the transformation matrix for the 3-points registration is determined and the LSD between the 3 registered points is determined, if the LSD is smaller than a predefined threshold value the registration is considered to be a possible candidate, from the list of resulting transformation matrices, those that are similar are determined and the list of related points is used for performing a N-points registrations, followed by a surface registration using only the surface information of the shell images, and
    for each point of the object to be registered for which a shell image is calculated, the x best matching shell images are determined and the resulting point correspondences are saved, for each point on both objects the three inertia axes of the local 3D surface are calculated, for each possible point correspondence firstly a registration is done of the local 3D surface of the first point of the correspondence onto the object of the second point of the correspondence, these registrations being evaluated by calculating the LSD distance between the local 3D surface and the object of the second point in the correspondence, whereby if the LSD is smaller than a predefined threshold value the transformation belonging to this registration is saved, from the resulting list of transformation matrices, those that are similar are determined and the list of related points is used for performing an N-points registration, followed by a surface registration using only the surface information of the shell images belonging to the transformations that were determined to be similar.

17. A computer based system for automatically finding correspondences between two or more digital representations of one or more 3D objects, the two or more digital representations of the one or more 3D objects comprising points, the system, which when executed by a processor, is configured to perform the following:
define a set of points for each of said digital representations in which shell images will be calculated,
calculate shell images for each of said digital representations of said 3D objects,
compare the shell images of one of the digital representation with the shell images of another of the digital representations,
indicate local correspondences between the digital representations based on a predefined criterion, wherein the calculating shell images comprises:
defining a set of concentric spherically symmetric shells or sphere shells with as centre point one of the points of said set of points;
assigning to each of said concentric spherically symmetric shells or sphere shells a value based on the part of said digital representation enclosed by two consecutive spherically symmetric shells or sphere shells;
converting said spherically symmetric shells or sphere shells to which a value has been assigned into an array containing said values, wherein
the value representing the part of the representations of said 3D objects of the object within the first sphere and in between each of two successive spherically symmetric shells such as spheres is calculated as a volume or weighted volume, and assigned to each spherically symmetric shell.

18. The system of claim 17 wherein one digital representation of the two or more digital representations is selected from:
having a resolution that is higher than that of another digital representation, and
an indirect or direct high resolution image.

19. The system of claim 17 wherein the two or more digital representations are of a patient's jaw, including bone and dentition.

20. The system of claim 17 further configured to import the two or more digital representations being images imported into a dedicated software application running on the computer system.

21. The system of claim 19, further configured to generate a 3D model of the bone and teeth based on image segmentation and volumetric meshing.

22. The system of claim 17 further registering/aligning configured to register/align two of the digital representations.

23. The system of claim 17 further configured to generate the shell images for a set of points defined in the two or more digital representations.

24. The system of claim 23 wherein the calculating the shell images are selected from:
calculating for the set of points lying on a surface model and/or center points of voxels in a volumetric representation, and
calculating the shell images in a point is adapted to define a number of concentric spherically symmetric shells or spheres with as center point said point and different values for the radius, and
being adapted to select radii so that the shell surfaces of successive spherically symmetric shells or spheres are at a fixed distance, or that the magnitude of the area of the planar section through the center point in between two successive spherically symmetric shells or spheres is the same.

25. The system of claim 24 further configured to normalize the values of the shell images by dividing each area value by the magnitude of the area of the corresponding planar section through the center point of the spherically symmetric shell or sphere, or by dividing each volume value by the volume enclosed by two successive spherically symmetric shells or spheres.

26. The system of claim 17 further configured to compare the shell images for the two or more representations selected from:
calculating the sum of the absolute value of the differences between the corresponding values of two 1D arrays as a measure for the similarity between the shell images, and
calculating a suitable distance such as the Euclidean distance is calculated between lists of values of the shell images, which are considered as points in n dimensional space, whereby the smaller the Euclidean distance the better the correspondence between the shell images, and
calculating a linear correlation between the shell images as a measure for the similarity between two shell images.

27. The system of claim 26 wherein the calculating a linear correlation is adapted so that corresponding values of 1D arrays of shell images are considered as points and the linear correlation fits a line through these points, wherein the linear correlation evaluates the correlation coefficient and also the slope of the fitted line and the slope is 1 in case of identical shell images.

28. The system according to claim 17, further adapted to register points of the object selected from:
for each point of the object to be registered for which a shell image is calculated, the x best matching shell images are determined and the resulting point correspondences are saved, for each point on both objects the three inertia axes of the local 3D surface are calculated, for each possible point correspondence firstly a registration of the objects is done by aligning the inertia axes of the corresponding points and then performing a surface registration and secondly the registration is evaluated by calculating the least square distance (LSD) between both objects, and the registration with the smallest LSD is kept as the optimal registration, and
for each point of the object to be registered for which a shell image is calculated, the x best matching shell images are determined and the resulting point correspondences are saved, for each combination of 3 corresponding point pairs (only those containing 6 different points), a three-point registration is performed, followed by a surface registration and a calculation of the LSD between both objects, and the registration with the smallest LSD is kept as the optimal registration, and
for each point of the object to be registered for which a shell image is calculated, the x best matching shell images are determined and the resulting point correspondences are saved, for each combination of 3.

* * * * *